United States Patent
Shankar et al.

(10) Patent No.: US 7,324,562 B1
(45) Date of Patent: Jan. 29, 2008

(54) METHOD AND APPARATUS FOR INTRODUCING DIFFERENTIAL DELAY BETWEEN VIRTUALLY CONCATENATED TRIBUTARIES

(75) Inventors: Subramani Shankar, Bangalore (IN); Velamur Krishnamachari Vasudevan, Bangalore (IN); Ponnusamy Kanagaralu, Bangalore (IN); Hariprasad Gangadharan, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 1049 days.

(21) Appl. No.: 10/327,250

(22) Filed: Dec. 20, 2002

(51) Int. Cl.
*H04J 3/06* (2006.01)

(52) U.S. Cl. ............... 370/517; 370/537; 370/907; 703/14

(58) Field of Classification Search ............... None
See application file for complete search history.

(56) References Cited

U.S. PATENT DOCUMENTS

| | | | |
|---|---|---|---|
| 4,433,378 A | 2/1984 | Leger | |
| 4,841,526 A | 6/1989 | Wilson et al. | |
| 4,920,483 A | 4/1990 | Pogue et al. | |
| 4,965,794 A | 10/1990 | Smith | |
| 5,079,693 A | 1/1992 | Miller | |
| 5,182,651 A | 1/1993 | Kishi | |
| 5,291,586 A | 3/1994 | Jen et al. | |
| 5,319,648 A | 6/1994 | Bux et al. | |
| 5,386,412 A | 1/1995 | Park et al. | |
| 5,471,628 A | 11/1995 | Phillips et al. | |
| 5,825,770 A | 10/1998 | Coady et al. | |
| 5,844,923 A | 12/1998 | Condon | |
| 5,930,830 A | 7/1999 | Mendelson et al. | |
| 5,964,835 A | 10/1999 | Fowler et al. | |
| 6,347,097 B1 | 2/2002 | Deng | |
| 6,442,669 B2 | 8/2002 | Wright et al. | |
| 6,584,584 B1 | 6/2003 | Smith | |
| 6,640,297 B1 | 10/2003 | Banning et al. | |
| 6,714,543 B1 | 3/2004 | Brueckheimer et al. | |
| 6,957,309 B1 | 10/2005 | Gupta et al. | |
| 2001/0049726 A1 | 12/2001 | Comeau et al. | |
| 2002/0009100 A1* | 1/2002 | Raghavan et al. | 370/474 |
| 2004/0064589 A1 | 4/2004 | Boucher et al. | |
| 2004/0117584 A1 | 6/2004 | Banerjee et al. | |
| 2004/0196847 A1* | 10/2004 | Kuwabara | 370/393 |

OTHER PUBLICATIONS

Nilam Ruparelia, *Delivering Ethernet Over Sonet Using Virtual Concatenation*, CommsDesign, Feb. 25, 2002, 8 pages, www.commsdesign.com/story/OEG20020225S0078.

(Continued)

*Primary Examiner*—Duc Ho
(74) *Attorney, Agent, or Firm*—Blakely, Sokoloff, Taylor & Zafman LLP

(57) ABSTRACT

In one embodiment, the invention is an apparatus for testing differential delay correction of network elements using virtual concatenation. The apparatus includes a first PRBS (pseudo-random bit stream) generator dedicated to a first tributary. The apparatus also includes an interface between the first PRBS generator and a tester. The apparatus further includes an interface between the first PRBS generator and a device under test. The apparatus may further include a second PRBS dedicated to a second tributary. The apparatus may also include a control logic block to control the first PRBS generator and the second PRBS generator, and coupled to the first PRBS generator and the second PRBS generator.

10 Claims, 7 Drawing Sheets

OTHER PUBLICATIONS

Louis E. Frenzel, *Programmable Framer Chip Improves OC-48 Efficiency*, Electronic Design, Apr. 16, 2001, 4 pages.

Michael Timothy Moore, *Filling the WAN-Communications-Line Card*, designfeature, Apr. 18, 2002, 5 pages, www.ednmag.com.

Eddie Kohler, Robert Morris, Benjie Chen, "Programming Language Optimizations For Modular Router Configurations" ACM SIGOPS Operating Systems Review, vol. 36, 30, 37, Issue 5, 5, 10, Oct. 2002.

Imrich Chlamtac et al., "Scalable WDM Access Network Architecture Based on Photonic Slot Routing" IEE/ACM Transactions on Networking (TON), vol. 7, Issue 1, pp. 1-9, Feb. 1999.

Finney et al. "Using a Common Barrel Shifter for operand normalization, operand alignment and operand unpack & pack in floating point", IBM TDB vol. 29 No. 2 Jul. 1986.

* cited by examiner

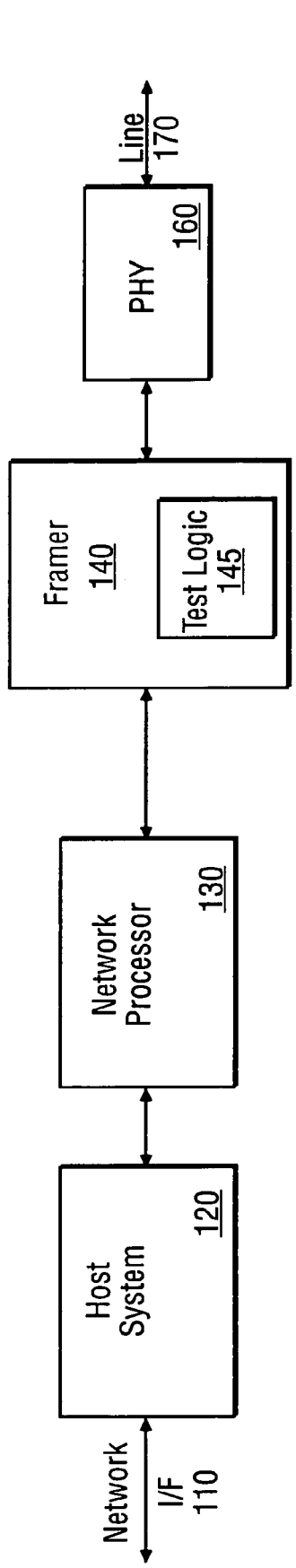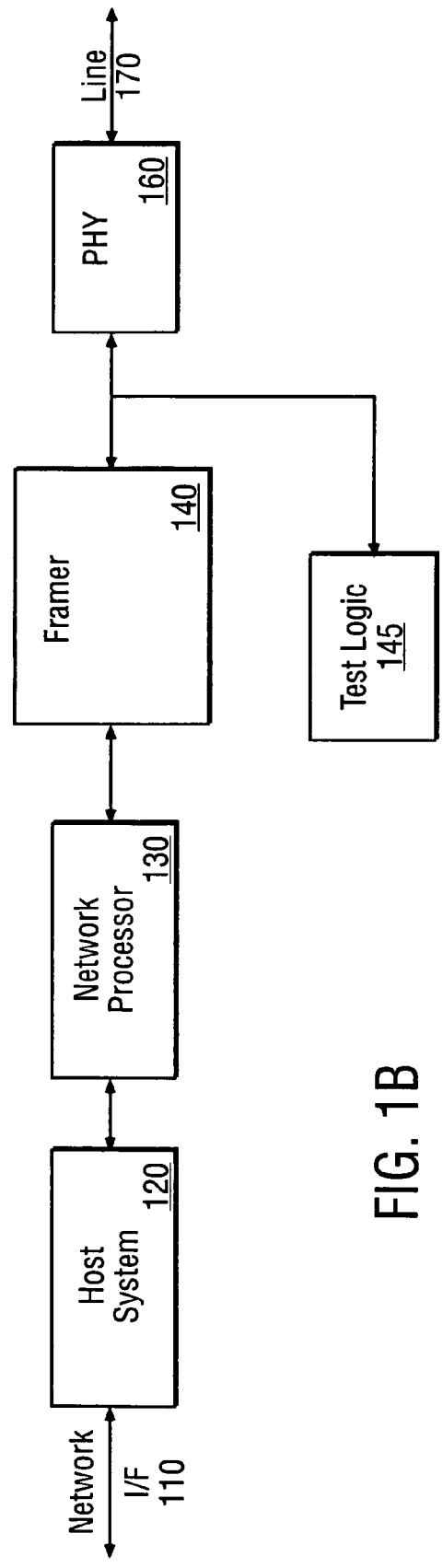
FIG. 1A
FIG. 1B

METHOD AND APPARATUS FOR INTRODUCING DIFFERENTIAL DELAY BETWEEN VIRTUALLY CONCATENATED TRIBUTARIES

FIELD

The present invention is generally related to testing of communications devices and is more specifically related to testing of network communications devices for long-haul communications using multiple virtual channels supporting differential delay.

BACKGROUND

In general, network communications can involve unpredictable delays while transporting data. These delays, depend on their path of traverse. Thus, communications hardware is generally designed to handle various delays incurred in multiple paths, while still retaining the integrity of the information communicated.

Within a packetized communications system, delays between packets can result in difficulties in transmission of information. Moreover, in a system using multiple paths, delays can vary from path to path. In a system sending packets over a virtual channel transport over multiple paths, delays are then potentially unpredictable and disruptive. Virtual channel communications in which packets may traverse multiple paths between source and destination are thus potentially fraught with error.

Simulating the differential delay between tributaries forming a channel is therefore potentially useful in testing communications systems and communications hardware supporting differential delay correction between virtually concatenated tributaries. A conventional method of simulation includes determining what data to send, determining appropriate delays to insert within data, and then providing the data and delays as a single unified package. This package may be a set of bytes to be transmitted, with data intermixed with bytes representing delays which must be filtered out. If the expected delays to be simulated are short relative to the time required to transmit the data, then this will not require too much overhead. However, as the duration of expected delays increases, the additional bytes representing delay in a simulation increase in a potentially exponential manner.

Thus, it may be advantageous to provide a test/simulation environment in which a different method of simulating differential delay is available, thus obviating the need for storage of bytes representing delay. Similarly, as testing of products is preferably repeatable, it may be advantageous to provide a repeatable method of simulating delay.

SUMMARY

In one embodiment, the invention is an apparatus for testing transmission using virtual concatenation. The apparatus includes a first PRBS (pseudo-random bit stream) generator dedicated to a first tributary. The apparatus also includes an interface between the first PRBS generator and a tester. The apparatus further includes an interface between the first PRBS generator and a device under test. The apparatus may further include a second PRBS dedicated to a second tributary. The apparatus may also include a control logic block to control the first PRBS generator and the second PRBS generator, and coupled to the first PRBS generator and the second PRBS generator.

In an alternate embodiment, the invention is a method of introducing programmable differential delay between tributaries within a virtually concatenated channel. The method includes providing a first seed value reflecting a delay to date for a first virtual channel with respect to other virtual channels. The method also includes providing a multi-frame indicator. The method further includes generating a first series of synchronous payload envelopes (SPEs) for a first tributary using a first PRBS generator having the first seed value. The method may also include transmitting the first series of SPEs. The method may further include providing a second seed value reflecting a delay to date for a second virtual channel with respect to other virtual channels. The method may also include generating a second series of synchronous payload envelopes (SPEs) for a second tributary using a second PRBS generator having the second seed value. The method may further include transmitting the second series of SPEs.

BRIEF DESCRIPTION OF THE DRAWINGS

The present invention is illustrated by way of example and not limitation in the accompanying figures.

FIG. 1A illustrates an embodiment of a system which may include test logic.

FIG. 1B illustrates an alternate embodiment of a system which may include test logic.

DETAILED DESCRIPTION

Figure 2:
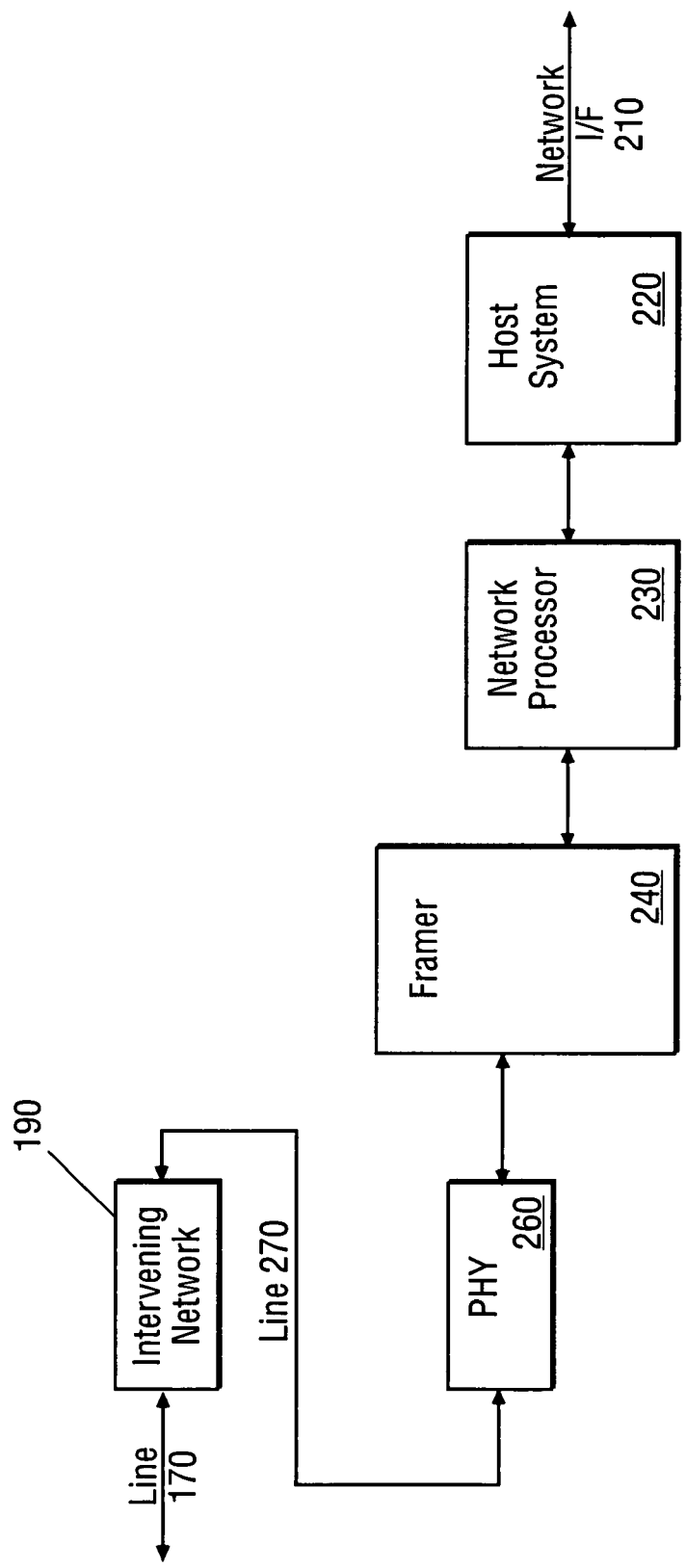
FIG. 2 illustrates an embodiment of a system which may be tested by test logic.

A method and apparatus for testing communications equipment is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Various descriptions of this document relate to devices or components being coupled together. Coupling typically denotes a relationship allowing for communication or connection between a first and second object. The first object may be directly connected to the second object. Alternatively, the first object may be directly connected to a third object which may also be directly connected to the second object, thereby achieving a coupling between the first object and the second object. As will be appreciated, the number of intermediate objects between two objects which are coupled together does not determine whether the objects are coupled, the presence of a link between the two objects indicates that the two objects are coupled together.

In general, the invention relates to generating a stream of bits providing both delay bytes and data bytes for transmission in a repeatable manner without requiring storage of the stream of bits. This may be accomplished using a PRBS (pseudo-random bit stream) generator with a programmable seed value, in conjunction with control logic and interface logic. The stream of bits may be used to test a communications link and associated communications hardware without requiring massive storage and accompanying resources in design of the PRBS generator. Furthermore, the PRBS generator may be scaled through duplication to provide multiple streams in a multiple channel (or multiple virtual channel) environment, while still preserving the low resource impact aspects of the design.

In one embodiment, the invention is an apparatus for testing transmission using virtual concatenation. The apparatus includes a first PRBS (pseudo-random bit stream) generator dedicated to a first tributary. The apparatus also includes an interface between the first PRBS generator and a tester. The apparatus further includes an interface between the first PRBS generator and a device under test. The apparatus may further include a second PRBS dedicated to a second tributary. The apparatus may also include a control logic block to control the first PRBS generator and the second PRBS generator, and coupled to the first PRBS generator and the second PRBS generator. Note that the virtual channels may be thought of as tributaries which feed into a stream, the combination of which provides the data transmitted.

In an alternate embodiment, the invention is a method of introducing programmable differential delay between tributaries within a virtually concatenated channel. The method includes providing a first seed value reflecting a delay to date for a first virtual channel with respect to other virtual channels. The method also includes providing a multi-frame indicator. The method further includes generating a first series of synchronous payload envelopes (SPEs) for a first tributary using a first PRBS generator having the first seed value. The method may also include transmitting the first series of SPEs. The method may further include providing a second seed value reflecting a delay to date for a second virtual channel with respect to other virtual channels. The method may also include generating a second series of synchronous payload envelopes (SPEs) for a second tributary using a second PRBS generator having the second seed value. The method may further include transmitting the second series of SPEs.

Turning to the system in which testing may occur in one embodiment, FIG. 1A illustrates an embodiment of a system which may include test logic. Data is received and sent on line 170, which may be a fiber optic cable for example. Coupled to line 170 is physical layer 160, which translates signals from line 170 into a form suitable for use by circuitry, such as through optoelectronic transformation. Coupled to physical layer 160 is framer 140, which operates to frame or deframe data for transmission or reception, and includes test logic 145. Test logic 145 may be implemented using the embodiments described with respect to FIGS. 6 and 7 for example. Coupled to framer 140 is network processor 130, which may be used to process data for transmission or reception. Coupled to network processor 130 is host system 120, which may transfer data between network processor 130 and a network interface 110 which couples to an internal network. Thus, the system of FIG. 1A may be connected to a line such as line 170, and then test logic 145 may be activated to test other systems or components connected to or coupled to line 170. In the alternate embodiment illustrated in FIG. 1B, test logic 150 is coupled to physical layer 160. Test logic 150 may be implemented in a similar manner to test logic 145, although the distinction between an integrated and a separate component may result in some design changes.

FIG. 2 illustrates an embodiment of a system which may be tested by test logic. Data is received and sent on line 170, which may be a fiber optic cable for example. Coupled to line 170 is intervening network 190, which is the network over which information passes. Note that in some test environments, intervening network may not be present, and lines 170 and 270 may be a single line.

Data is also received and sent on line 270, which may also be a fiber optic cable for example. Coupled to line 270 is physical layer 260, which translates signals from line 270 into a form suitable for use by circuitry, such as through optoelectronic transformation. Coupled to physical layer 260 is framer 240, which operates to frame or deframe data for transmission or reception. Coupled to framer 240 is network processor 230, which may be used to process data for transmission or reception. Coupled to network processor 230 is host system 220, which may transfer data between network processor 230 and a network interface 210 which couples to an internal network. Typically, testing of framer 240 would involve the test logic 145 previously discussed. However, it may be useful to test various other components of the system using test logic 145. Moreover, the system depicted is exemplary in nature, and many other systems used with a network may be tested using test logic 145 or similar test logic for example.

Figure 3:
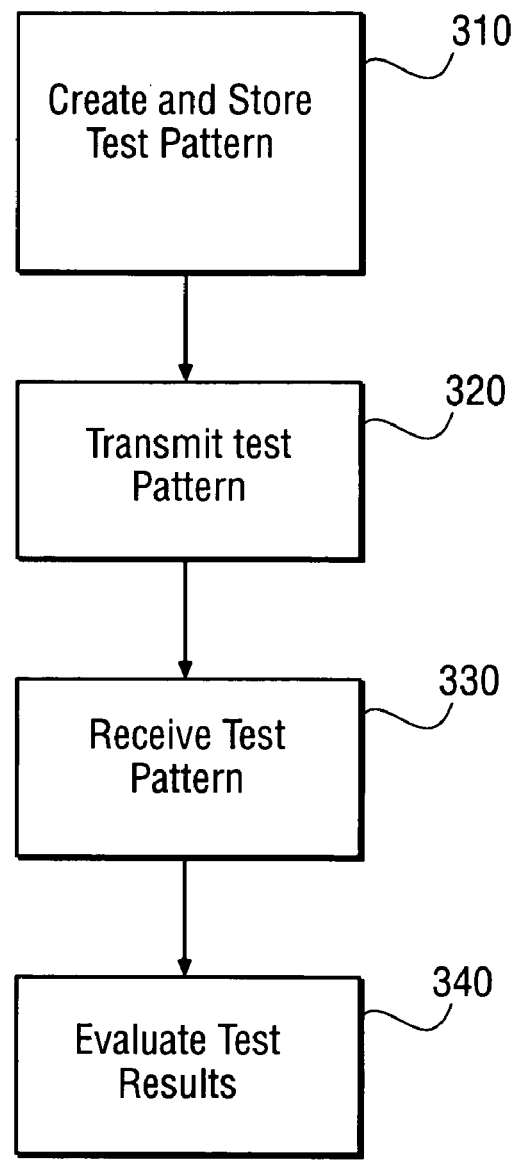
FIG. 3 illustrates an embodiment of a conventional test methodology in flow diagram format.

Testing of components, such as the components of the system of FIG. 2, may be accomplished in many ways. FIG. 3 illustrates an embodiment of a conventional test methodology in flow diagram format. At block 310, a test pattern is created and stored in memory. The test pattern thus created can be read out of memory for purposes of testing a device, and may be expected to remain consistent from test to test. At block 320, the test pattern is read out of memory and transmitted to a device under test. At block 330, the device under test receives the test pattern and processes it. At block 340, the results of reception of the test pattern are evaluated, determining if the device under test passes the test.

The test pattern created at block 310 includes both actual data to be received by the device under test, and bytes representing delays in transmission, which the device under test should filter out. As mentioned previously, when the delay time is small relative to the transmission time for the data, the actual data will dominate the size of the test pattern. However, when delay time increases and is large relative to data transmission time, the bytes representing delay time also increase in quantity, and the size of the test pattern increases similarly. For example, if a transmission time may be expected to be approximately 10 ms for test data, and delays may be on the order of ~500 ms between packets, the data representing the delay may occupy 50 times the space occupied by actual test data. Moreover, even having similar delay and data transmission times does not guarantee small space requirements, as a large quantity of data to be transmitted as part of a test may require much storage space, too.

Figure 4:
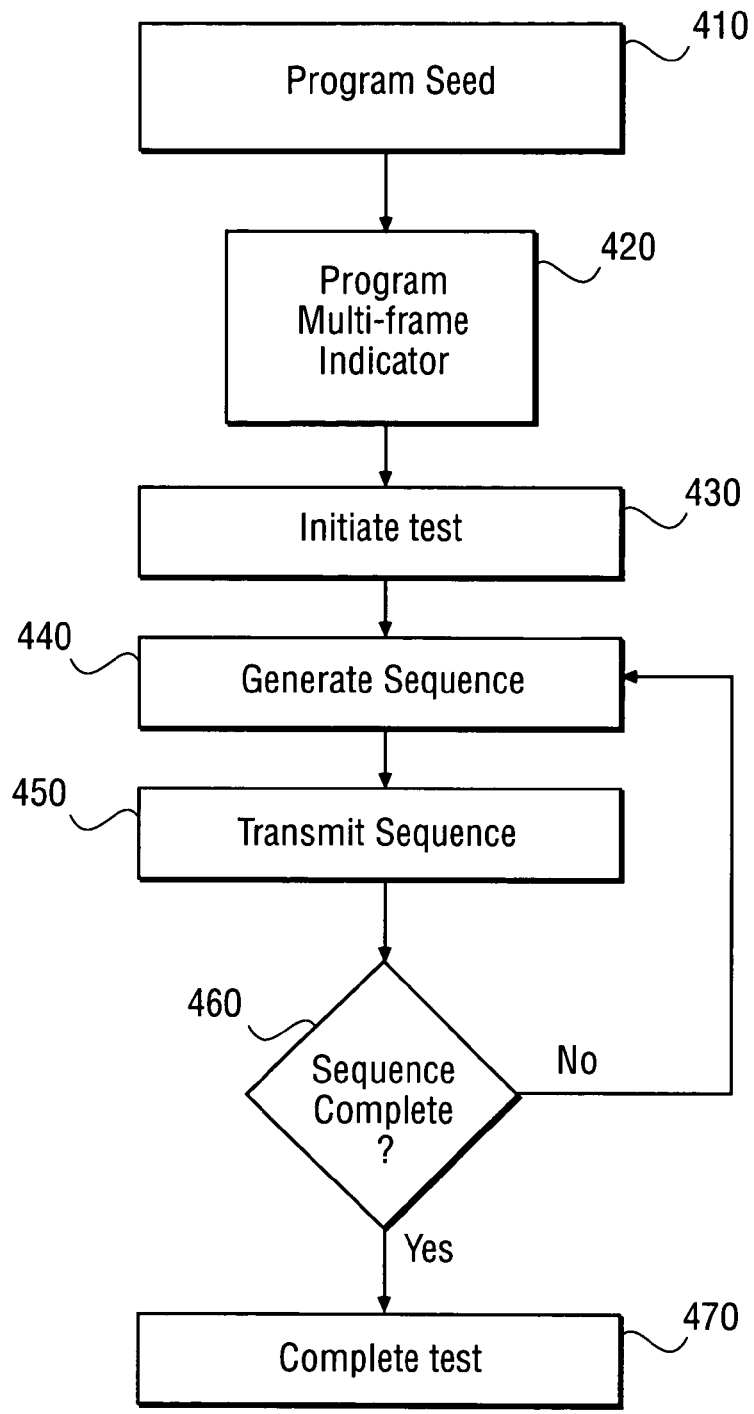
FIG. 4 illustrates an embodiment of a test methodology using a PRBS (pseudo-random bit stream) generator in flow diagram format.

Preferably then, a method of generating test data without requiring storage of that data may be provided. FIG. 4 illustrates an embodiment of a test methodology using a PRBS (pseudo-random bit stream) generator in flow diagram format. This does not require a large storage space, as it relies on repeatable activity of a circuit to generate a bit stream, rather than reading a bit stream from memory.

At block 410, a seed value for a PRBS generator is programmed, thereby determining the output of the PRBS generator until the seed value is reprogrammed. At block 420, the multi-frame indicator for the framer is programmed, thereby indicating that data will span multiple frames during transmission (and thus reception). At block 430, the test is initiated, such as by supplying an enable signal to the PRBS generator. At block 440, the PRBS generator generates a sequence of bits which make up the test pattern. At block 450, the sequence generated at block 440 is transmitted to a destination device. Either the receiver or the transmitter is the device under test in this case. At block 460, a determination is made as to whether the sequence is complete. If not, the process returns to block 440, and the sequence continues. If so (the sequence is complete), then the process proceeds to block 470 and the test is completed. Completion may involve evaluating the results of the test in some manner, such as reading the data stored by a receiver for example.

Figure 5:
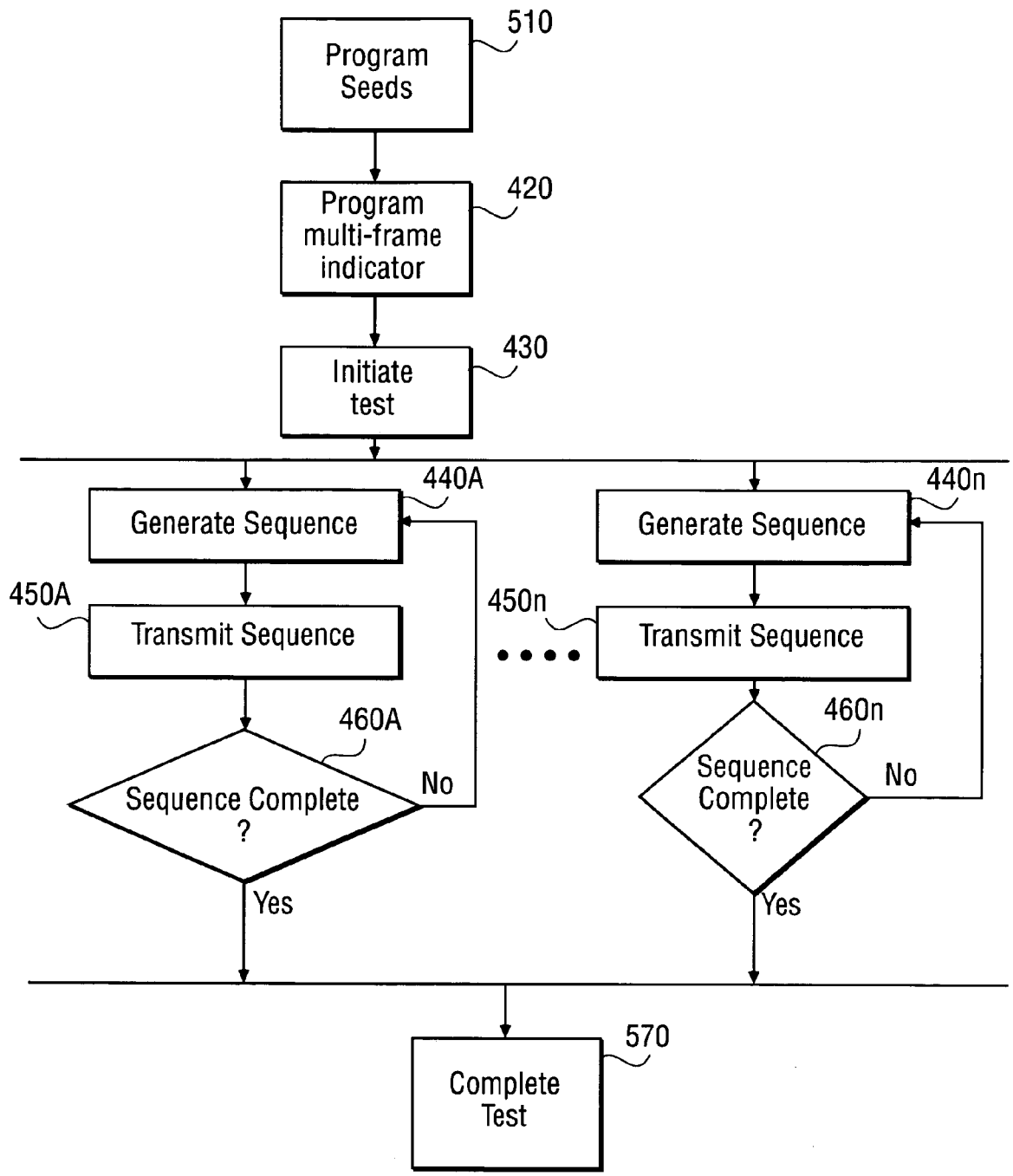
FIG. 5 illustrates an alternate embodiment of a test methodology using a PRBS generator in flow diagram format.

This test methodology may be implemented in a parallel fashion for multiple channel environments. FIG. 5 illustrates an alternate embodiment of a test methodology using a PRBS generator in flow diagram format. At block 510, a seed value for each PRBS generator is programmed, thereby determining the output of the PRBS generator(s) until the seed value is reprogrammed. This may need to be done for multiple PRBS generators in parallel or serial fashion, depending on how the test is to be performed. At block 420, the multi-frame indicator for the framer is programmed, thereby indicating that data will span multiple frames during transmission (and thus reception). At block 430, the test is initiated, such as by supplying an enable signal to the PRBS generator(s).

At block 440a, the first PRBS generator generates a sequence of bits which make up the test pattern. At block 450a, the sequence generated at block 440a is transmitted to a destination device. Either the receiver or the transmitter is the device under test in this case. At block 460a, a determination is made as to whether the sequence from the first PRBS generator is complete. If not, the process returns to block 440a, and the sequence continues. If so (the sequence is complete), then the process proceeds to block 570 and the test is completed. Completion may involve evaluating the results of the test in some manner, such as reading the data stored by a receiver for example.

The process of blocks 440a, 450a and 460a is essentially duplicated for each PRBS generator a through n, such that block 440n, 450n and 460n represent the process for PRBS generator n. The process for each PRBS generator occurs in parallel with the process for each other PRBS generator in one embodiment, allowing for generation of data streams for multiple channels (or multiple virtual channels) which may be transmitted essentially simultaneously (such as in an interleaved manner). Note that the various independent PRBS generators may have different sequence lengths for test data, or they may all have the same sequence length.

Figure 6:
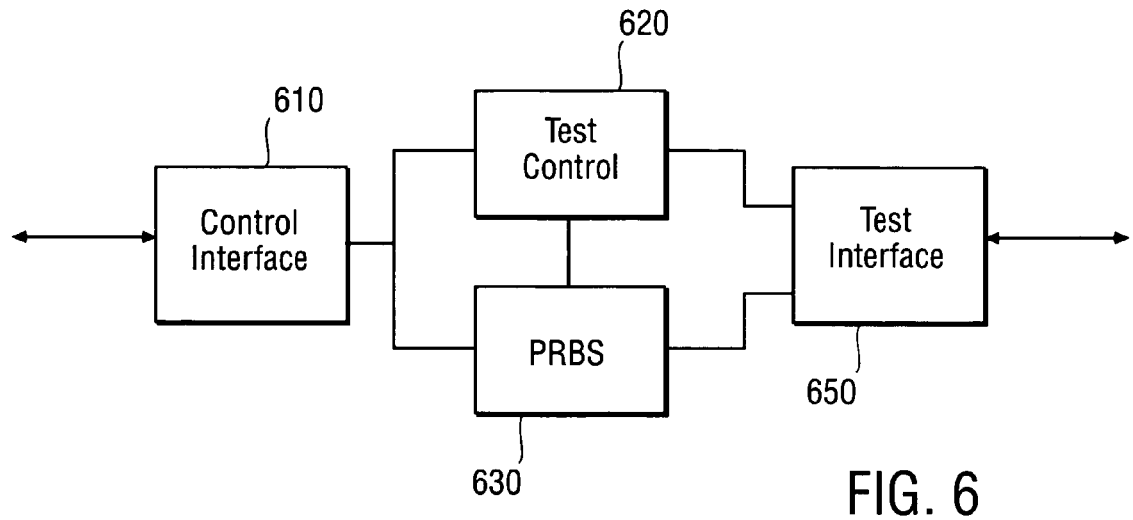
FIG. 6 illustrates an embodiment of a test subsystem using a PRBS generator in block diagram form.

The test methodology of FIG. 4, and similar methodologies, may be implemented using circuitry. FIG. 6 illustrates an embodiment of a test subsystem using a PRBS generator in block diagram form. Control interface 610 provides an interface with control signals from a test system, for example. Test control 620 is coupled to control interface, and handles such tasks as regulating a clock and enable signals for the PRBS generator 630, and programming seed values. The PRBS generator 630 generates a pseudo-random bit stream which may be used to test communications hardware. Test interface 650 is coupled to test control 620 and PRBS generator 630, and provides an interface with the device under test, potentially through hardware of a dedicated test system for example. Thus, control signals may be sent through control interface 610, along with a seed value, to prompt test control 620 to program the seed value of PRBS generator 630 and cause PRBS generator 630 to provide a bit stream output at test interface 650.

Figure 7:
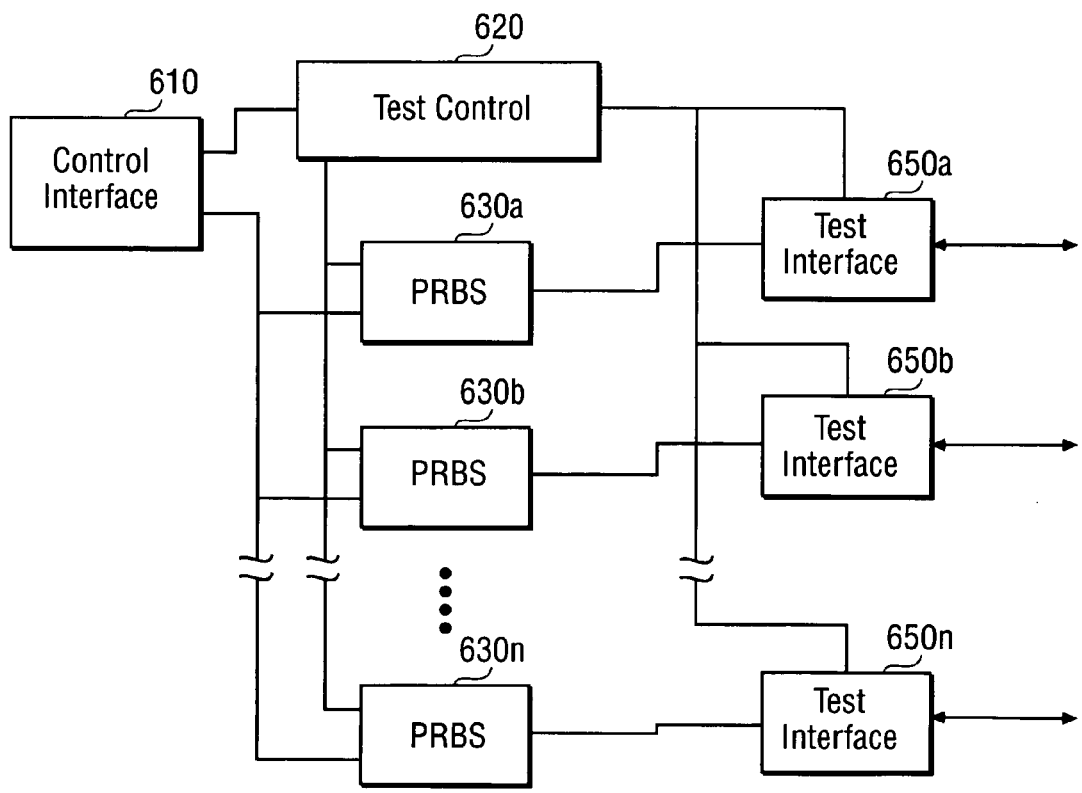
FIG. 7 illustrates an alternate embodiment of a test subsystem using a PRBS generator in block diagram form.

For multiple channel environments, an expanded version of the embodiment of FIG. 6 may be utilized. FIG. 7 illustrates an alternate embodiment of a test subsystem using PRBS generators in block diagram form. Control interface 610 provides an interface with control signals from a test system, for example. Test control 620 is coupled to control interface, and handles such tasks as regulating a clock and enable signals for the PRBS generators 630a-n, and programming seed values. The PRBS generators 630a-n generate a pseudo-random bit stream, each of which may be used to test a channel or virtual channel of communications hardware. Test interfaces 650a-n is coupled to test control 620 and PRBS generators 630a-n, and provides an interface with the device under test, potentially through hardware of a dedicated test system for example.

Test interfaces 650a-n may be provided as a single unified test interface, rather than separate units in some embodiments. Furthermore, in some embodiments, PRBS generators 630a-n may be individually controlled and enabled by test control 620, allowing for use of as many or as few channels as desired, within the limits of the test system. Likewise, test control 620 may be split up into multiple test control blocks which are dedicated to an individual PRBS generator and corresponding channel. Control signals may be sent through control interface 610, along with a seed value (or values), to prompt test control 620 to program the seed values of PRBS generators 630a-n and cause PRBS generators 630a-n to provide bit stream outputs at test interfaces 650a-n.

Figure 8:
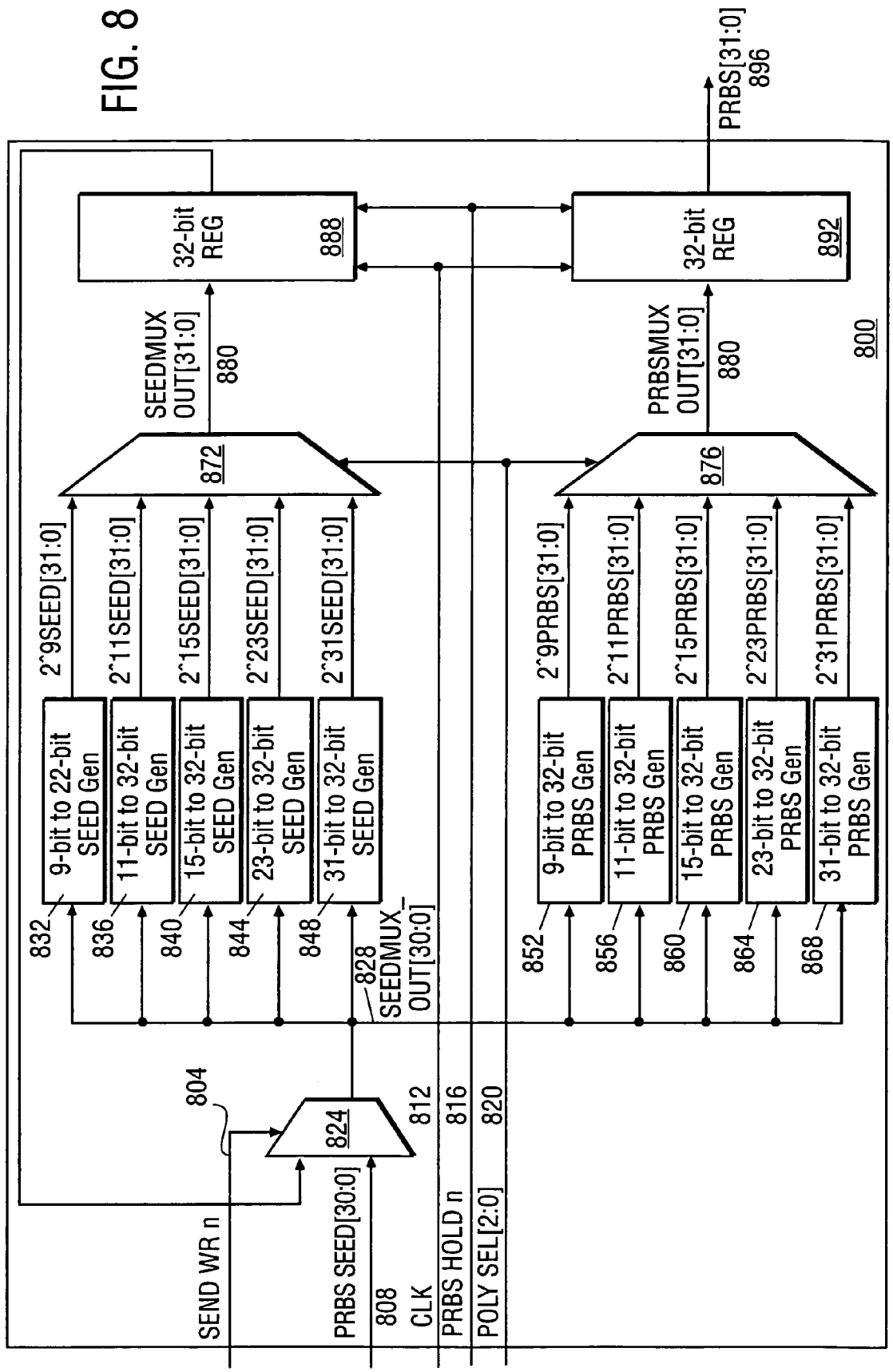
FIG. 8 illustrates an embodiment of a PRBS generator.

Ultimately, some form of PRBS generator is implemented to allow the method or apparatus to function. FIG. 8 illustrates an embodiment of a PRBS generator. This embodiment may be used to generate a 32 bit wide bit stream, and is clearly exemplary in nature. In general, the embodiment allows for programming of a seed value, and then generation of a bit stream based on that seed value. The implementation of this embodiment is a linear feedback shift register, but other implementations may be used, preferably such that a deterministic stream of data may be generated.

PRBS generator 800 uses combinatorial logic, synchronous (clocked) registers, a feedback loop, a seed value input, and control signals to generate a pseudo-random bit stream. Seed write signal 804 selects whether the PRBS generator feeds back a value (continuing a stream) or accepts a new seed value through multiplexer 824. The actual seed value 808 is provided, in one embodiment, as a 31 bit value. The multiplexer output 828 is provided to various combinatorial logic blocks for purposes of generation of pseudo-random data. Each of seed generators 832, 836, 840, 844, 848, 852, 856, 860, 864, and 868 have a dedicated set of logic which may be used to manipulate input data in a predictable manner. The outputs of each of these seed generators are provided to one of two multiplexers 872 and 876.

A further customization of the bit stream may be provided through use of polynomial select signals 820, which determine which output of the seed generators is routed to each of the registers 888 and 892 (as seed multiplexer output 880 and PRBS multiplexer output 884 respectively). The outputs (880 and 884 respectively) of multiplexers 872 and 876 are provided to seed register 888 and PRBS register 892 respectively. The output of seed register 888 is provided to multiplexer 824 as feedback, and the output 896 of PRBS register is the output of the PRBS generator 800. Based on the seed value programmed in, the output 896 of the PRBS generator 800 may be expected to provide the synchronous payload envelopes (SPEs) used for testing purposes, simulating both data and delay.

The following material provides equations for the combinatorial logic of the various seed generators and other selection signal information in one embodiment.

The following table indicates what type of seed will be used based on the polynomial select signals 820 in one embodiment.

| PRBS_POLYNOMIALS | Poly Sel 820 | |
|---|---|---|
| $X^{31}$ | 000 | $B27 \oplus B31$ |
| $X^{23}$ | 001 | $B17 \oplus B22$ |
| $X^{15}$ | 010 | $B13 \oplus B14$ |
| $X^{11}$ | 011 | $B8 \oplus B10$ |
| $X^{9}$ | 100 | $B8 \oplus B4$ |
| $X^{9}$ | 101 | $B8 \oplus B4$ |
| $X^{9}$ | 110 | $B8 \oplus B4$ |
| $X^{9}$ | 111 | $B8 \oplus B4$ |

The following descriptions apply to the various seed generators 832, 836, 840, 844, 848, 852, 856, 860, 864, and 868 in one embodiment.

9-bit PRBS GEN (832 and 852): This block generates a 32-bit PRBS pattern from a 9-bit input. The equations for each of the output bits are given below.

| Bit | Equation |
|---|---|
| $2\hat{\,}9PRBS\,[0:8]$ | $B\,[8:0]$ |
| $2\hat{\,}9PRBS9$ | $B8 \oplus B4$ |
| $2\hat{\,}9PRBS10$ | $B7 \oplus B3$ |
| $2\hat{\,}9PRBS11$ | $B6 \oplus B2$ |
| $2\hat{\,}9PRBS12$ | $B5 \oplus B1$ |
| $2\hat{\,}9PRBS13$ | $B1 \oplus B0$ |
| $2\hat{\,}9PRBS14$ | $B8 \oplus B4 \oplus B3$ |
| $2\hat{\,}9PRBS15$ | $B7 \oplus B3 \oplus B2$ |
| $2\hat{\,}9PRBS16$ | $B6 \oplus B2 \oplus B1$ |
| $2\hat{\,}9PRBS17$ | $B5 \oplus B1 \oplus B0$ |
| $2\hat{\,}9PRBS18$ | $B8 \oplus B0$ |
| $2\hat{\,}9PRBS19$ | $B8 \oplus B7 \oplus B4$ |
| $2\hat{\,}9PRBS20$ | $B7 \oplus B6 \oplus \oplus B3 \oplus B2$ |
| $2\hat{\,}9PRBS21$ | $B6 \oplus B5 \oplus B2$ |
| $2\hat{\,}9PRBS22$ | $B5 \oplus B4 \oplus B1$ |
| $2\hat{\,}9PRBS23$ | $B4 \oplus B3 \oplus B0$ |
| $2\hat{\,}9PRBS24$ | $B8 \oplus B4 \oplus \oplus B3 \oplus B2$ |
| $2\hat{\,}9PRBS25$ | $B7 \oplus B3 \oplus B2 \oplus B1$ |
| $2\hat{\,}9PRBS26$ | $B6 \oplus B2 \oplus B1 \oplus B0$ |
| $2\hat{\,}9PRBS27$ | $B8 \oplus B5 \oplus B4 \oplus B1 \oplus B0$ |
| $2\hat{\,}9PRBS28$ | $B8 \oplus B7 \oplus B3 \oplus B0$ |
| $2\hat{\,}9PRBS29$ | $B8 \oplus B7 \oplus B6 \oplus B4 \oplus B3 \oplus B2$ |
| $2\hat{\,}9PRBS30$ | $B7 \oplus B6 \oplus B5 \oplus B1$ |
| $2\hat{\,}9PRBS31$ | $B6 \oplus B5 \oplus B4 \oplus B2 \oplus B0$ |

11-bit PRBS GEN (836 and 856): This block generates a 32-bit PRBS pattern from an 11-bit input. The equations for each of the output bits are given below.

| Bit | Equation |
|---|---|
| $2\hat{\,}11PRBS\,[0:10]$ | $B\,[10:0]$ |
| $2\hat{\,}11PRBS11$ | $B10 \oplus B8$ |
| $2\hat{\,}11PRBS12$ | $B9 \oplus B7$ |
| $2\hat{\,}11PRBS13$ | $B8 \oplus B6$ |
| $2\hat{\,}11PRBS14$ | $B7 \oplus B5$ |
| $2\hat{\,}11PRBS15$ | $B6 \oplus B4$ |
| $2\hat{\,}11PRBS16$ | $B5 \oplus B3$ |
| $2\hat{\,}11PRBS17$ | $B4 \oplus B2$ |
| $2\hat{\,}11PRBS18$ | $B3 \oplus B1$ |
| $2\hat{\,}11PRBS19$ | $B2 \oplus B0$ |
| $2\hat{\,}11PRBS20$ | $B10 \oplus B8 \oplus B1$ |
| $2\hat{\,}11PRBS21$ | $B9 \oplus B7 \oplus B0$ |
| $2\hat{\,}11PRBS22$ | $B10 \oplus B6$ |
| $2\hat{\,}11PRBS23$ | $B9 \oplus B5$ |
| $2\hat{\,}11PRBS24$ | $B8 \oplus B4$ |
| $2\hat{\,}11PRBS25$ | $B7 \oplus B3$ |
| $2\hat{\,}11PRBS26$ | $B6 \oplus B2$ |
| $2\hat{\,}11PRBS27$ | $B5 \oplus B1$ |
| $2\hat{\,}11PRBS28$ | $B4 \oplus B0$ |
| $2\hat{\,}11PRBS29$ | $B10 \oplus B8 \oplus B3$ |
| $2\hat{\,}11PRBS30$ | $B9 \oplus B7 \oplus B2 \oplus B0$ |
| $2\hat{\,}11PRBS31$ | $B8 \oplus B6 \oplus B1$ |

15-bit PRBS GEN (840 and 860): This block generates a 32-bit PRBS pattern from a 15-bit register. The equations for each of the output bits are given below.

| Bit | Equation |
|---|---|
| $2\hat{\,}15PRBS\,[0:14]$ | $B\,[14:0]$ |
| $2\hat{\,}15PRBS15$ | $B14 \oplus B13$ |
| $2\hat{\,}15PRBS16$ | $B13 \oplus B12$ |
| $2\hat{\,}15PRBS17$ | $B12 \oplus B11$ |
| $2\hat{\,}15PRBS18$ | $B11 \oplus B10$ |
| $2\hat{\,}15PRBS19$ | $B10 \oplus B9$ |
| $2\hat{\,}15PRBS20$ | $B9 \oplus B7$ |
| $2\hat{\,}15PRBS21$ | $B8 \oplus B6$ |
| $2\hat{\,}15PRBS22$ | $B7 \oplus B6$ |
| $2\hat{\,}15PRBS23$ | $B6 \oplus B5$ |
| $2\hat{\,}15PRBS24$ | $B5 \oplus B4$ |
| $2\hat{\,}15PRBS25$ | $B4 \oplus B3$ |
| $2\hat{\,}15PRBS26$ | $B3 \oplus B2$ |
| $2\hat{\,}15PRBS27$ | $B2 \oplus B1$ |
| $2\hat{\,}15PRBS28$ | $B1 \oplus B0$ |
| $2\hat{\,}15PRBS29$ | $B14 \oplus B13 \oplus B0$ |
| $2\hat{\,}15PRBS30$ | $B14 \oplus B12$ |
| $2\hat{\,}15PRBS31$ | $B13 \oplus B11$ |

23-bit PRBS GEN (844 and 864): This block generates a 32-bit PRBS pattern from a 23-bit register. The equations for each of the output bits are given below.

| Bit | Equation |
|---|---|
| $2\hat{\,}23PRBS\,[0:22]$ | $B\,[22:0]$ |
| $2\hat{\,}23PRBS23$ | $B22 \oplus B17$ |
| $2\hat{\,}23PRBS24$ | $B21 \oplus B16$ |
| $2\hat{\,}23PRBS25$ | $B20 \oplus B15$ |
| $2\hat{\,}23PRBS26$ | $B19 \oplus B14$ |
| $2\hat{\,}23PRBS27$ | $B18 \oplus B13$ |
| $2\hat{\,}23PRBS28$ | $B17 \oplus B12$ |
| $2\hat{\,}23PRBS29$ | $B16 \oplus B11$ |
| $2\hat{\,}23PRBS30$ | $B15 \oplus B10$ |
| $2\hat{\,}23PRBS31$ | $B14 \oplus B9$ |

31-bit PRBS GEN (848 and 868): This block generates a 32-bit PRBS pattern from a 31-bit register. The equations for each of the output bits are given below.

| Bit | Equation |
|---|---|
| 2^31PRBS [0:30] | B [31:1] |
| 2^31PRBS31 | B30 $\oplus$ B27 |

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 6 may be integrated into components, or may be subdivided into components. Similarly, the blocks of FIG. 4 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. A method of introducing programmable differential delay between tributaries within a virtually concatenated channel comprising:
   providing a first seed value reflecting a delay to date for a first virtual channel with respect to other virtual channels;
   programming a multi-frame indicator to the delay; and
   generating a first series of synchronous payload envelopes (SPEs) for a first tributary using a first Pseudo-random Bit Stream (PRBS) having the first seed value.

2. The method of claim 1, further comprising:
   Transmitting the first series of SPEs.

3. The method of claim 2, further comprising:
   Providing a second seed value reflecting a delay to date for a second virtual channel with respect to other virtual channels.

4. The method of claim 3, further comprising:
   Generating a second series of synchronous payload envelopes (SPEs) for a second tributary using a second PRBS having the second seed value.

5. The method of claim 4, further comprising:
   Transmitting the second series of SPEs.

6. The method of claim 5, further comprising:
   Determining results of generating and transmitting the first series of SPEs and the second series of SPEs.

7. An apparatus for testing transmission using virtual concatenation comprising:
   Means for providing a first seed value reflecting a delay to date for a first virtual channel with respect to other virtual channels;
   Means for providing a multi-frame indicator; and
   Means for generating a first series of synchronous payload envelopes (SPEs) for a first tributary using a first Pseudo-random Bit Stream (PRBS) with the first seed value.

8. The apparatus of claim 7, further comprising:
   Means for transmitting the first series of SPEs.

9. The apparatus of claim 8, further comprising:
   Means for providing a second seed value reflecting a delay to date for a second virtual channel with respect to other virtual channels;
   Means for generating a second series of synchronous payload envelopes (SPEs) for a second tributary with the second seed value; and
   Means for transmitting the second series of SPEs.

10. The apparatus of claim 9, further comprising:
    Means for evaluating results of generating and transmitting the first series of SPEs and the second series of SPEs.

* * * * *